United States Patent [19]
Yamazaki et al.

[11] Patent Number: 5,632,704
[45] Date of Patent: May 27, 1997

[54] DIFFERENTIAL APPARATUS

[75] Inventors: Nobushi Yamazaki; Isao Hirota, both of Tochigi, Japan

[73] Assignee: Tochigi Fuji Sangyo Kabushiki Kaisha, Tochigi-ken, Japan

[21] Appl. No.: 450,803

[22] Filed: May 25, 1995

[30] Foreign Application Priority Data

May 30, 1994 [JP] Japan .................................. 6-116646

[51] Int. Cl.$^6$ .................................................. F16H 48/06
[52] U.S. Cl. ............................................. 475/248; 475/252
[58] Field of Search ....................................... 475/226, 248, 475/249, 252; 74/665 G, 665 GD; 403/354, 355, 359

[56] References Cited

U.S. PATENT DOCUMENTS

| | | |
|---|---|---|
| 1,195,314 | 8/1916 | Williams . |
| 1,373,657 | 4/1921 | Finefrock . |
| 2,000,223 | 5/1935 | Du Pras . |
| 2,157,465 | 5/1939 | Smitt .......................... 475/255 |
| 2,269,734 | 1/1942 | Powell . |
| 2,462,000 | 2/1949 | Randall . |
| 2,789,446 | 4/1957 | Schoenrock . |
| 2,900,846 | 8/1959 | Lehman . |
| 2,972,265 | 2/1961 | Walter . |
| 3,095,761 | 7/1963 | Hilado . |
| 3,251,244 | 5/1966 | Nickell . |
| 3,292,456 | 12/1966 | Saari . |

(List continued on next page.)

FOREIGN PATENT DOCUMENTS

| | | |
|---|---|---|
| 0130806 | 1/1985 | European Pat. Off. . |
| 0356401 | 2/1990 | European Pat. Off. . |
| 899549 | 8/1944 | France . |
| 951431 | 4/1949 | France . |
| 2256350 | 7/1975 | France . |
| 2566080 | 12/1985 | France . |
| 4013200 | 10/1991 | Germany . |
| 4013196 | 10/1991 | Germany . |
| 59-97346 | 6/1984 | Japan . |
| 237300 | 8/1945 | Switzerland . |
| 27123 | of 1912 | United Kingdom . |
| 2234791 | 2/1991 | United Kingdom . |

*Primary Examiner*—Charles A. Marmor
*Assistant Examiner*—Peter T. Kwon
*Attorney, Agent, or Firm*—Greenblum & Bernstein P.L.C.

[57] ABSTRACT

A differential apparatus comprises a differential casing, a pair of helical side gears, and at least one pair of long and short helical pinion gears. The long helical pinion gear includes first and second gear portions and the short helical pinion gear includes first and second gear portions. The apparatus may include gear coupling portions for coupling the first and second gear portions of the long and short helical pinion gears via a long gear shaft or a short gear shaft, respectively. Since the first and second gear portions of the long or short helical pinion gear can be coupled to the long or short gear shaft by use of the common coupling portions, it is possible to obtain a larger or smaller differential limiting force by exchanging the helix angle relationship (thrust directions) of the two helical pinion gears. Further, when the first and second gear portions of the long or short helical pinion gear are coupled to be axially movable, it is possible to obtain an intermediate, differential limiting force.

17 Claims, 10 Drawing Sheets

U.S. PATENT DOCUMENTS

| | | | |
|---|---|---|---|
| 3,360,285 | 12/1967 | Huckshold | 403/355 X |
| 3,406,593 | 10/1968 | Vesey . | |
| 3,706,239 | 12/1972 | Myers . | |
| 3,738,192 | 6/1973 | Belansky . | |
| 4,171,939 | 10/1979 | Harwath | 403/354 X |
| 4,365,524 | 12/1982 | Dissett et al. . | |
| 4,677,876 | 7/1987 | Dissett . | |
| 4,751,853 | 6/1988 | Dissett . | |
| 4,916,978 | 4/1990 | Razelli et al. . | |
| 5,022,645 | 6/1991 | Green | 403/354 X |
| 5,055,096 | 10/1991 | Riemschied et al. . | |
| 5,122,101 | 6/1992 | Tseng . | |
| 5,169,370 | 12/1992 | Dye et al. . | |
| 5,205,797 | 4/1993 | Kobayashi et al. | 475/249 X |
| 5,232,416 | 8/1993 | Amborn et al. . | |
| 5,244,440 | 9/1993 | Ichiki et al. . | |
| 5,292,291 | 3/1994 | Ostertag . | |
| 5,302,159 | 4/1994 | Dye et al. | 475/226 X |
| 5,310,389 | 5/1994 | Sato . | |
| 5,322,488 | 6/1994 | Ra et al. | 475/150 X |
| 5,346,443 | 9/1994 | Crysler et al. . | |
| 5,366,422 | 11/1994 | Dye et al. . | |
| 5,415,601 | 5/1995 | Cilano | 475/248 X |
| 5,458,546 | 10/1995 | Teraoka | 475/248 |

FRONT DRIVE

REAR DRIVE

FRONT DRIVE

REAR DRIVE

DIFFERENTIAL APPARATUS

BACKGROUND OF THE INVENTION

1. Field of the Invention

The present invention relates to a differential apparatus, and more specifically to a differential apparatus provided with a frictional differential limiting function suitable for use in an automotive vehicle.

2. Description of the Prior Art

An example of prior art differential apparatus related to the present invention is disclosed in U.S. Pat. No. 5,244,440, for instance. In this prior art differential apparatus, an engine drive power is first transmitted to a differential casing of the differential apparatus, and then distributed to both rear right and left wheels via two pairs of helical pinion gears in mesh with a pair of helical side gears, respectively. Further, the four helical pinion gears are accommodated in gear accommodating holes formed in the differential casing.

In the above-mentioned two pairs of the helical pinion gears, each helical pinion gear is composed of a first gear portion of narrow face width and a second gear portion of wide face width, and both the first and second gear portions are formed Integral with each other. In a pair of the two helical pinion gears, the first narrow face-width gear portion of the first helical pinion gear is in mesh with the second wide face-width gear portion of the second helical pinion gear. Further, the second wide face-width gear portion of the first helical gear is in mesh with one of the helical side gear, and the second wide face-width gear portion of the second helical pinion gear is in mesh with the other of the helical side gear.

When the engine drive power is being transmitted, since the helical pinion gears are urged against the wall surfaces of the accommodating holes formed in the casing, respectively due to reaction force generated by gearing among the helical pinion gears and the helical side gears, and in addition since a thrust force is generated in each of the helical pinion gears by gearing among the these helical pinion gears and the side gears, a frictional force is generated between the outer gear surfaces of each of the helical pinion gears and each of the wall surfaces of the differential casing, so that it is possible to limit the differential motion of the differential apparatus on the basis of these generated frictional forces.

Here, the differential gear limiting force generated between the helical pinion gears and the wall surfaces of the differential casing changes largely in dependence upon the helix angles of the gear teeth of the two geared helical pinion gears (described later in further detail with reference to the attached drawings). In other words, it is possible to control the differential limiting force of the differential apparatus by changing the relationship with respect to the helix gear tooth angle between the two geared helical pinion gears.

In the prior art differential apparatus, however, since the first or second helical pinion gear composed of the first and second pinion gears is formed integral with each other respectively, when the differential limiting forces of various degree in frontward and rearward travel directions are required, a number of the helical pinion gears of various helix gear tooth angles must be prepared, with the result that there exists a problem in that the kinds of parts increases and thereby the cost thereof is high. In addition, there exists another problem in that it is rather difficult to assemble a plurality (e.g., four) of helical pinion gears formed integral with both the narrow and wide face-width gear portions in the differential casing simultaneously.

SUMMARY OF THE INVENTION

With these problems in mind, therefore, it is the object of the present invention to provide a differential apparatus which can provide a wide range of differential limiting force at a relatively low cost.

To achieve the above-mentioned object, the present invention provides a differential apparatus, comprising: a differential casing (21); a pair of helical side gears (31, 33) arranged at a central portion of said differential casing; at least one pair of long and short helical pinion gears (51, 53; 87, 89; 111, 89) arranged around said helical side gears within said differential casing; said long helical pinion gear being composed of first and second gear portions (55, 57; 91, 93; 115, 117) and said short helical pinion gear being composed of first and second gear portions (61, 63; 97, 99); the first gear portion (55; 91; 115) of said long helical pinion gear being in mesh with the first gear portion (61; 97) of said short helical pinion gear; the second gear portion (57; 93; 117) of said long helical pinion gear being in mesh with said second helical side gear (33) and the second gear portion (63; 99) of said short helical pinion gear being in mesh with said first helical side gear (31); and gear coupling means (71, 73; 106, 108; 119, 123; 133, 135) for coupling the separate first and second gear portions of at least one of said long and short helical pinion gears.

Here, said gear coupling means is common gear coupling means (71, 73; 106, 108) for coupling the first and second gear portions of said long helical pinion gear via a long gear shaft (59; 95) and the first and second gear portions of said short helical pinion gear via a short gear shaft (65; 101), respectively in common.

Further, said common gear coupling means (71, 73, 75) couples the first and second gear portions of said long and short helical pinion gears, fixedly. Or else, said common gear coupling means (106, 108) couples the first and second gear portions of said long and short helical pinion gears, axially movably.

Further, said common gear coupling means comprises: cylindrical recessed portions (71) formed on at least one side of each of the first and second gear portions of said long and short helical pinion gears, respectively, each of said cylindrical recessed portions being engaged with one of cylindrical projections (73) formed on both sides of the long and short gear shafts, respectively; and gear fixing pins (75) each for fixedly coupling each of the first and second gear portions of said long and short helical pinion gears with the long and short gear shafts, respectively.

Further, said common gear coupling means comprises cylindrical recessed portions (106) having a radial groove (107) formed on both sides of each of the first and second gear portions of said long and short helical pinion gears, respectively, said cylindrical recessed portions being engaged with one of cylindrical projections (108) having a radial projection (109) formed on both sides of the long and short gear shafts, respectively.

Further, said gear coupling means comprises: a cylindrical recessed portion (119) formed on one side of one of the first and second gear portions of said short helical pinion gear; and a cylindrical projection (123) formed on one side of the other of the first and second gear portions of said short gear shafts, the cylindrical projection being engaged with the cylindrical recessed portion.

Further, said gear coupling means comprises: a cylindrical projection portion (129) having a radial recessed portion (133) formed on one side of any of the first and second gear portions of said long helical pinion gear; and a cylindrical projection (131) having a radial projection (135) formed on one side of any of the first and second gear portions of said long helical pinion gear, the radial projection (135) being engaged with the radial recessed portions (133).

Further, said gear coupling means is a gear shaft formed integral with the first and second gear portions (115, 117) of said long helical pinion gear (111).

Further, when said the first and second gear portions of said long and short helical pinion gear are fixedly coupled via the long and short gear shaft (59; 95), respectively by said gear coupling means, in such a way that helix gear tooth angles of the first and second gear portions of each of said long and short helical pinion gears are the same with respect to each other, respectively, thrust forces generated by gearing among said long and short helical pinion gears and said side gears are canceled with each other to generate a minimum differential limiting force.

Further, when said the first and second gear portions of said long and short helical pinion gear are fixedly coupled via the long and short gear shaft (59; 95), respectively by said gear coupling means, in such a way that helix gear tooth angles of the first and second gear portions of each of said long and short helical pinion gears are opposite to each other, respectively, thrust forces generated by gearing among said long and short helical pinion gears and said side gears are added to each other to generate a maximum differential limiting force.

Further, when said the first and second gear portions of said long and short helical pinion gear are coupled axially movably via the long and short gear shaft (59; 95), respectively by said gear coupling means, in such a way that helix gear tooth angles of the first and second gear portions of each of said long and short helical pinion gears are the same with respect to each other, respectively, thrust forces generated by gearing among said long and short helical pinion gears and said side gears are canceled somewhat with each other to generate an intermediate differential limiting force. Further, when the first and second gear portions of said long helical pinion gear are fixedly coupled via the long gear shaft by said gear coupling means, and the first and second gear portions of said short helical pinion gear are coupled axially movably via the short gear shaft by said gear coupling means, in such a way that helix gear tooth angles of the first and second gear portions of each of said long and short helical pinion gears are the same with respect to each other, respectively, thrust forces generated by gearing among said long and short helical pinion gears and said side gears are canceled somewhat with each other to generate an intermediate differential limiting force only when said helical pinion gear is rotated in a predetermined direction.

In the differential apparatus according to the present invention, since the first and second gear portions of the long and short helical pinion gears can be formed by use of the common gear coupling portion, it is possible to easily change the helix angle relationship between the two helical pinion gears by exchanging the first gear portion with the second gear portion or vice versa, so that it is possible to generate a small differential limiting force (A type) or a large differential limiting force (B type). Further, when the gear portions of the helical pinion gears are formed axially movably, it is possible to further finely adjust the differential limiting force of the differential apparatus. As a result, It is possible to selectively obtain any desired differential limiting force in a wide range according to various vehicle models at relatively low cost, without previously providing a number of different helical pinion gears.

In addition, when the first and second gear portions of one of the long and short helical pinion gears are formed so as to axially movably, since the differential limiting force can be increased only during the frontward drive, it is possible to prevent the interference of the engine brake with the antilock brake system.

Further, in assembling process, since the respective helical gears can be engaged with the related other helical gear or gears one by one, it is possible to facilitate the assembly work of the differential apparatus of helical gear type.

DETAILED DESCRIPTION OF THE EMBODIMENTS

Figure 1:
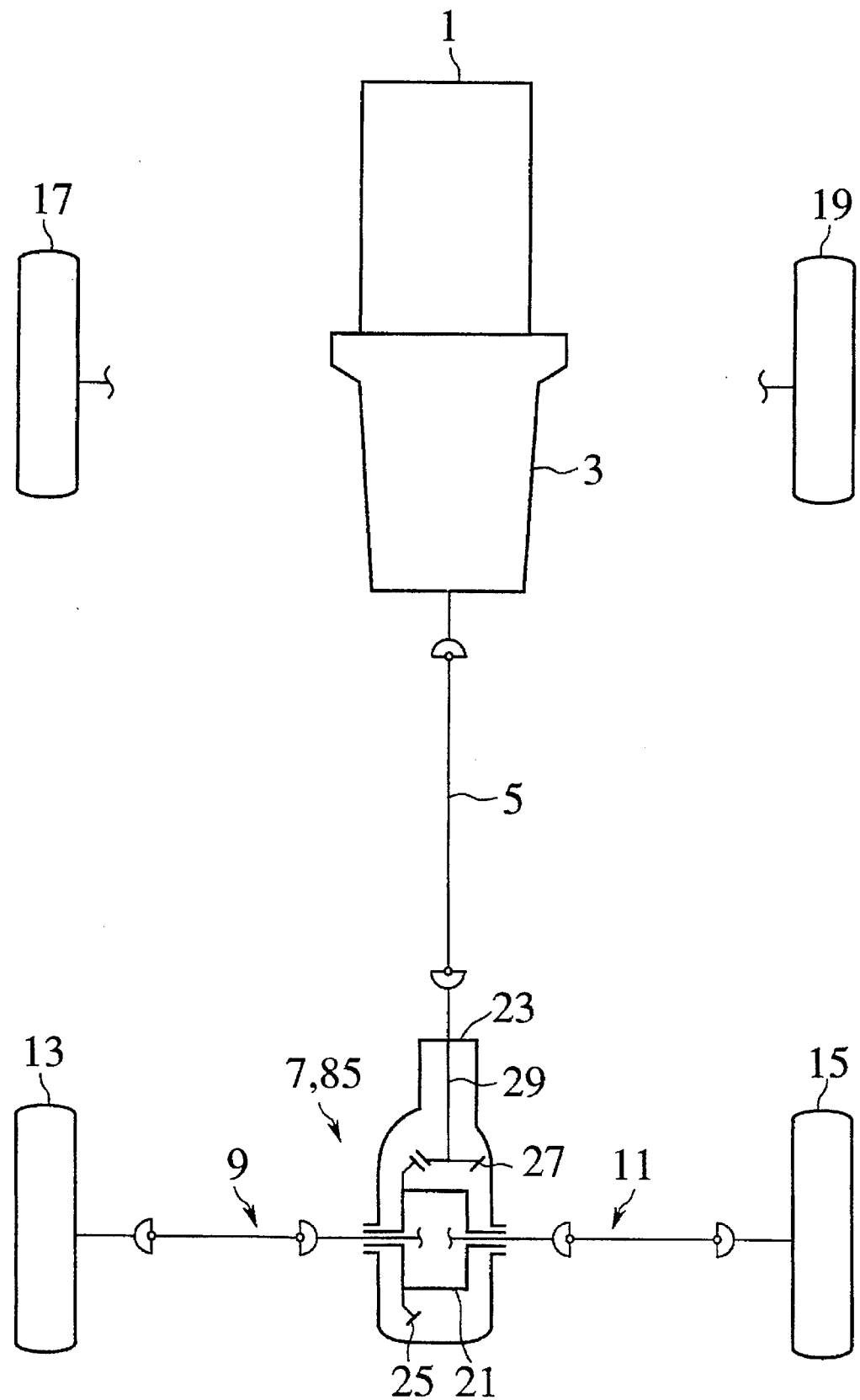
FIG. 1 is a skeletal diagram showing a power drive system for an automotive vehicle, to which the embodiments of the differential apparatus according to the present invention is applied.

Prior to the description of the differential apparatus according to the present invention, a power system for an automotive vehicle will be explained with reference to FIG. 1. In FIG. 1, the power system for an automotive vehicle is composed of an engine 1, a transmission 3, a propeller shaft 5, a rear differential gear (to which the differential apparatus according to the present invention is applied) 7 or 85, two rear wheel shafts 9 and 11, two rear wheels 13 and 15, two front wheels 17 and 19, etc.

A differential casing 21 of the rear differential apparatus 7 is rotatably housed in a differential carrier 23. Further, a ring gear 25 is fixed to this differential casing 21. The ring gear 25 is in mesh with a drive pinion 27 formed integral with a drive pinion shaft 29 linked with the propeller shaft 5. Further, an oil sump is formed within the differential carrier 23. Therefore, when the engine 1 is driven, the engine drive power can be transmitted from the engine 1 to the differential casing 21 by way of the transmission 3, the propeller shaft 5, the drive pinion gear shaft 29, the drive pinion gear 27 and the ring gear 25, to rotate the differential casing 21.

Figure 2:
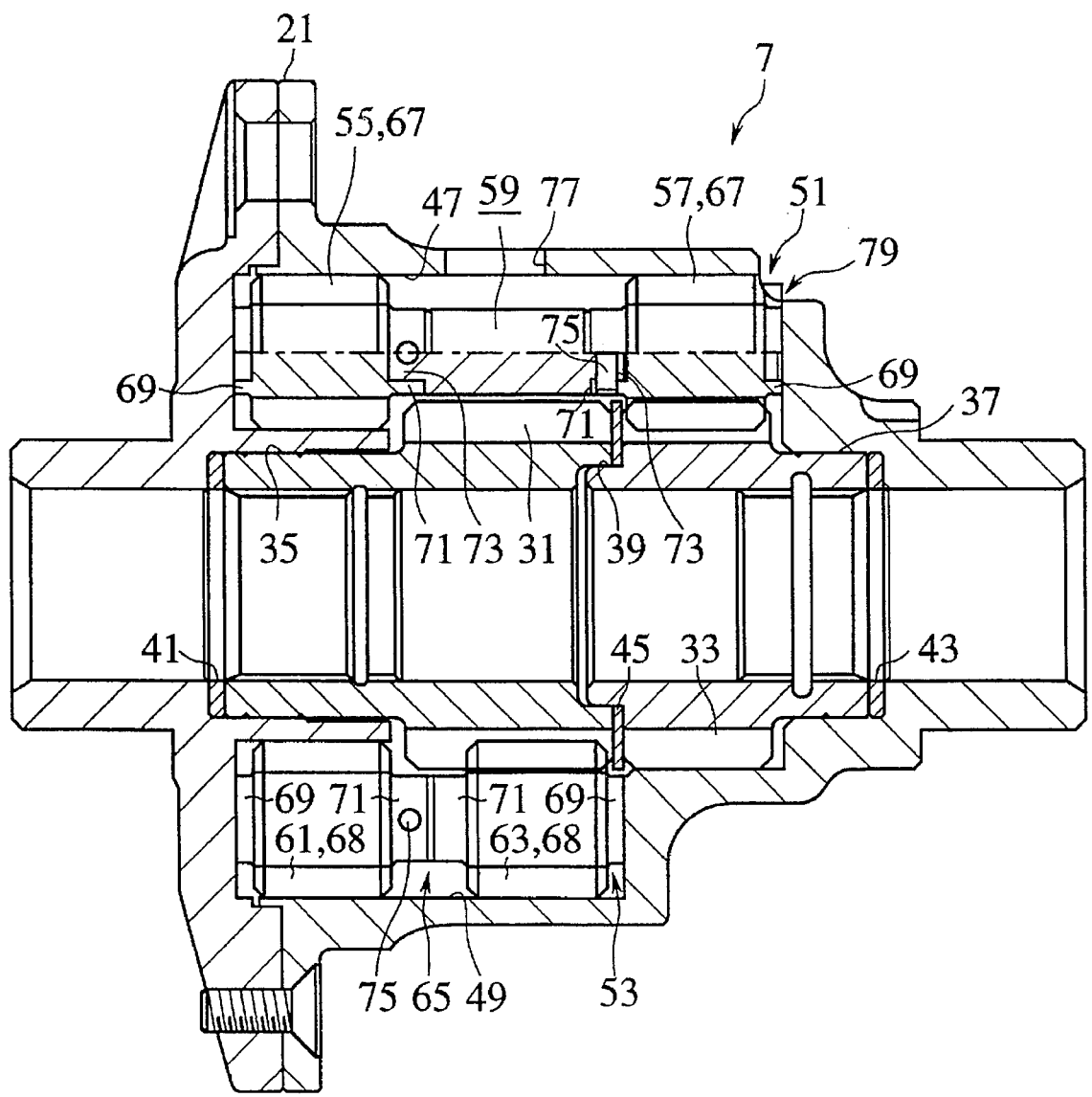
FIG. 2 is a cross-sectional view showing a first embodiment of the differential apparatus according to the present invention.
Figure 3A:
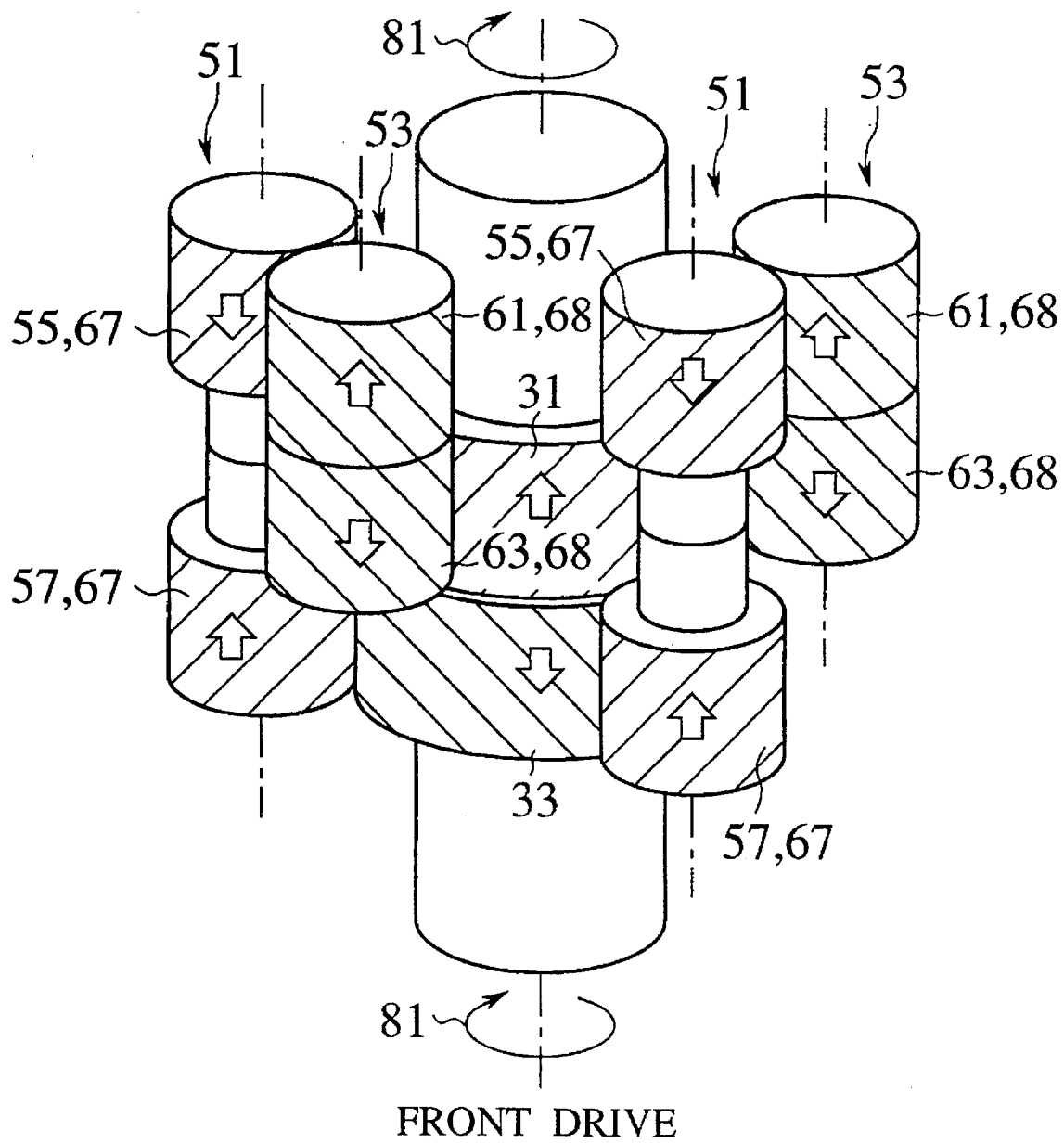
FIG. 3A is a diagrammatical perspective view for assistance in explaining the thrust directions generated in the respective helical pinion gears of the first embodiment of the differential apparatus shown in FIG. 2, in which an automotive vehicle is driven In a frontward direction.
Figure 3B:
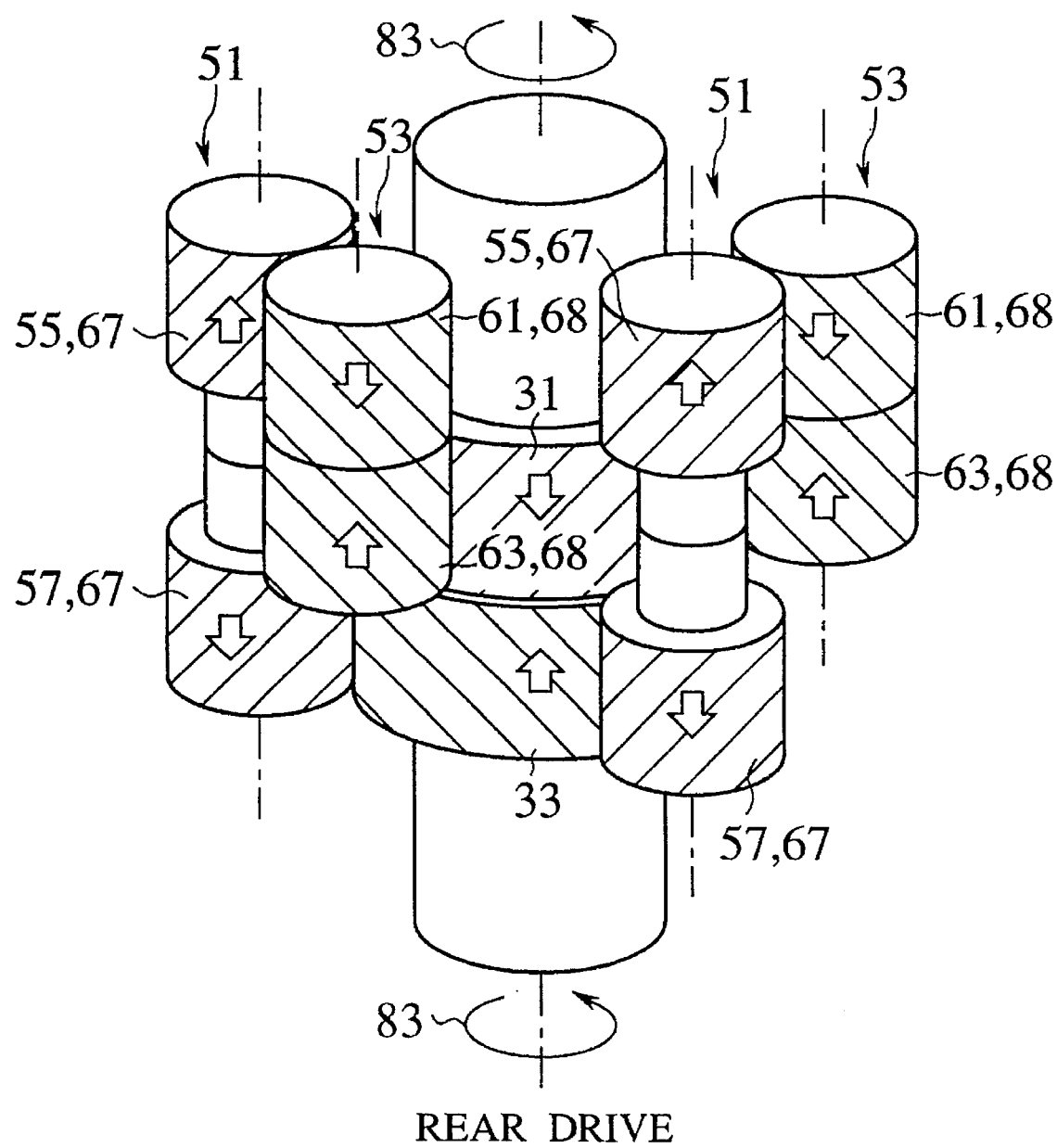
FIG. 3B is a diagrammatical perspective view for assistance in explaining the thrust directions generated In the respective helical pinion gears of the same differential apparatus shown In FIG. 2, in which an automotive vehicle is driven in a rearward direction.

With reference to FIGS. 2, 3A and 3B, a first embodiment of the differential apparatus according to the present invention will be described hereinbelow. The differential apparatus 7 is roughly composed of the differential casing 21, a pair of helical side gears 31 and 33, and two pairs of helical pinion gears 51 and 53. The helical side gears 31 and 33 are rotatably supported by two shaft supports 35 and 37 formed at the central portion of the differential casing 21 and further mutually by a mutual shaft support portion 39 formed between the two opposing end surfaces of the two helical side gears 31 and 33 so as to be centered with respect to each other. Further, two washers 41 and 43 are interposed between the differential casing 21 and the two helical side gears 31 and 33, respectively. In addition, another washer 45 is interposed between the two centered opposing end surfaces of the two helical side gears 31 and 33. The left helical side gear 31 is spline-coupled with the left wheel shaft 9, and the right helical side gear 33 is spline-coupled with the right wheel shaft 11, respectively.

The differential casing 21 is formed with two pairs of long and short gear accommodating holes 47 and 49. Two pairs of long and short helical pinion gears 51 and 53 are accommodated in these holes 47 and 49 respectively, so as to be rotatable and further slidable therewithin.

The long helical pinion gear 51 is composed of a first gear portion 55 and a second gear portion 57, and a small-diameter shaft portion 59 for coupling two gear portions 55 and 57. On the other hand, the short helical pinion gear 53 is composed of a first gear portion 61 and a second gear portion 63, and a small-diameter gear shaft portion 65 for coupling two gear portions 61 and 63.

The first gear portion 55 of the long helical pinion gear 51 is in mesh with the first gear portion 61 of the short helical pinion gear 53. Further, the second gear portion 57 of the long helical pinion gear 51 is in mesh with the right helical side gear 33. The second gear portion 63 of the short helical pinion gear 53 is in mesh with the left helical side gear 31.

Further, each of these four gear portions 55 and 57, 61 and 63 of the long and short helical gears 51 and 53 is formed with a short outer cylindrical recessed portion 69 on one end surface thereof and a long inner cylindrical recessed portion 71 on the other end surface thereof. Therefore, the external shape (the blank element) of these gear portions is the same with respect to each other. However, the helix tooth angle 67 of the two gear portions 55 and 57 of the long helical pinion gear 51 is opposite to that 68 of the two gear portions 61 and 63 of the short helical gear 53, as shown in FIGS. 3A and 3B.

Further, each of the long and short gear shafts 59 and 65 is formed with a cylindrical projection 73 on both side ends thereof so as to be fitted Into the cylindrical recessed portions 71 of each of the four gear portions 55 and 57, 61 and 63, respectively.

Accordingly, the long helical pinion 51 can be formed by fitting the two cylindrical projection portions 73 of the long gear shaft 59 into the two cylindrical recessed portions 71 of the two helical pinion gears 55 and 57, respectively and further by fixing these elements with a pin 75 (fixing member extending In the radial direction thereof), respectively. In the same way, the short helical pinion 53 can be formed by fitting the two cylindrical projection portions 73 of the short gear shaft 65 into the two cylindrical recessed portions 71 of the two helical pinion gears 61 and 63, respectively and further by fixing these elements with a pin 75, respectively.

The cylindrical projection portions 73 of the gear shafts 59 and 65, the cylindrical recessed portions 71 of the first and second gear portions 55, 57, 61 and 63, and the fixing pins 75 constitute gear coupling means.

Further, the differential casing 21 is formed with two oil openings 77 and 79 to allow oil to flow through the oil sump formed in the differential casing 21 for lubrication of the above-mentioned gearing portions and other sliding portions of the differential apparatus.

In operation, when the differential casing 21 is rotated by the engine 1, the engine power is transmitted from the ring gear 25 to the right and left rear wheels 13 and 15 by way of the long and short helical pinion gears 51 and 53 and the two helical side gears 31 and 33, respectively. Here, when a difference in driving resistivity is generated between the two right and left rear wheels 13 and 15, since the long and short helical pinion gears 51 and 53 rotate around its own axis, respectively, engine power can be distributed differentially into the right and left rear wheels 13 and 15.

In the differential torque transmission as described above, since the long and short helical pinion gears 51 and 53 are urged against the wall surfaces of the accommodating holes 47 and 49 formed in the differential casing 21, respectively due to mutual reaction forces generated between the helical pinion gear 51 and the helical side gear 33 and between the helical pinion gear 53 and the helical side gear 31, so that friction resistance can be generated at the respective gear contact surfaces thereof. In addition, other friction resistances can be generated among the two helical side gears 31 and 33, the three washers 41, 43 and 45 and the differential casing 21 due to thrust forces generated by the gearing between the long and short helical pinion gears 51 and 53. As a result, it is possible to obtain a differential limiting force of torque sensitive type (which varies according to the generated friction resistances), so that the vehicle as shown in FIG. 1 can be driven stably at start and acceleration.

The respective helical tooth arrangement and the thrust directions of the long and short helical pinion gears 51 and 53 will be described in further detail with reference to FIGS. 3A and 3B. FIG. 3A shows the state where the vehicle is driven in the frontward direction and the reference numeral 81 denotes the rotational direction of the differential casing 21; and FIG. 3B shows the state where the vehicle is driven in the rearward direction and 83 denotes the rotational direction of the same.

In the long helical pinion gear 51, the helix angle of the gear teeth of the first gear portion 55 is the same as that of the second gear portion 57. Further, in the short helical pinion gear 53, the helix angle of the gear teeth of the first gear portion 61 is the same as that of the second gear portion 63. However, the helix angles of the gear teeth of the long and short helical gears 51 and 53 are opposite to each other. The above-mentioned helix angle relationship is referred to as A type. In this A type, the thrust forces (inward) of the first and second gear portions 55 and 57 of the long helical pinion gear 51 are opposite to each other. Further, the thrust forces (outward) of the first and second gear portions 61 and 63 of the short helical pinion gear 53 are also opposite to each other. Further, in this first embodiment, since these first and second gear potions 55 and 57 or 61 and 63 are fixed to the gear shaft 59 or 65, respectively with the fixing pins 75, the generated thrust forces can be canceled with each other, so that the differential limiting force can be reduced to that extent.

On the other hand, when the first gear portion 55 of the long helical pinion gear 51 and the first gear portion 61 of the short pinion gear 61 are replaced with each other, it is possible to generate a large differential limiting force by adding these two thrust forces of the first and second gear portions 55 and 57 or 61 and 63 of the long or short pinion gears 51 or 53, respectively. The above-mentioned helix angle relationship is referred to as B type. In this B type, the thrust forces (e.g., leftward) of the first and second gear portions 55 and 57 of the long helical pinion gear 51 are the same with respect to each other. Further, the thrust forces (e.g., rightward) of the first and second gear portions 61 and 63 of the short helical pinion gear 53 are also the same with respect to each other. Therefore, the generated thrust forces can be added to each other, so that the differential limiting force can be increased to that extent.

Figure 4A:
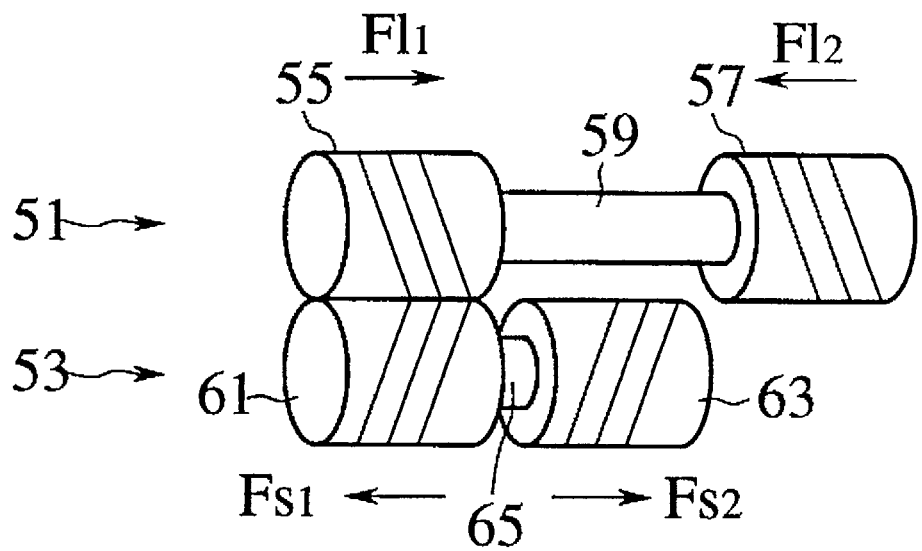
FIG. 4A is a diagrammatical perspective view showing the gear arrangement of the first and second gear portions of the long and short helical pinion gears in the first embodiment, in which the helix gear tooth angles of the first and second gear portions thereof are the same with respect to each other.

The above-mentioned A and B types will be explained in further detail with reference to FIGS. 4A and 4B. In FIG. 4A, the helix angles of the teeth of the first and second gear portions 55 and 57 or 61 and 63 are the same with respect to each other, respectively (A type). In this case, since the directions of the thrust forces of the two pinion gears 55 and 57 or 61 and 63 are opposite to each other, the resultant thrust force F of the two long and short helical pinion gears 51 and 53 can be expressed as follows:

$$F=|Fl_1-Fl_2|+|Fs_1-Fs_2|$$

where $Fl_1$ denotes the thrust force generated by the first gear portion 55 of the long helical pinion gear 51; $Fl_2$ denotes the thrust force generated by the second gear portion 57 of the long helical pinion gear 51; $Fs_1$ denotes the thrust force generated by the first gear portion 61 of the short helical pinion gear 53; and $Fs_2$ denotes the thrust force generated by the second gear portion 63 of the short helical pinion gear 53. In this case, the actual differential limiting force can be obtained by multiplying the resultant thrust force F by a friction coefficient fc.

Figure 4B:
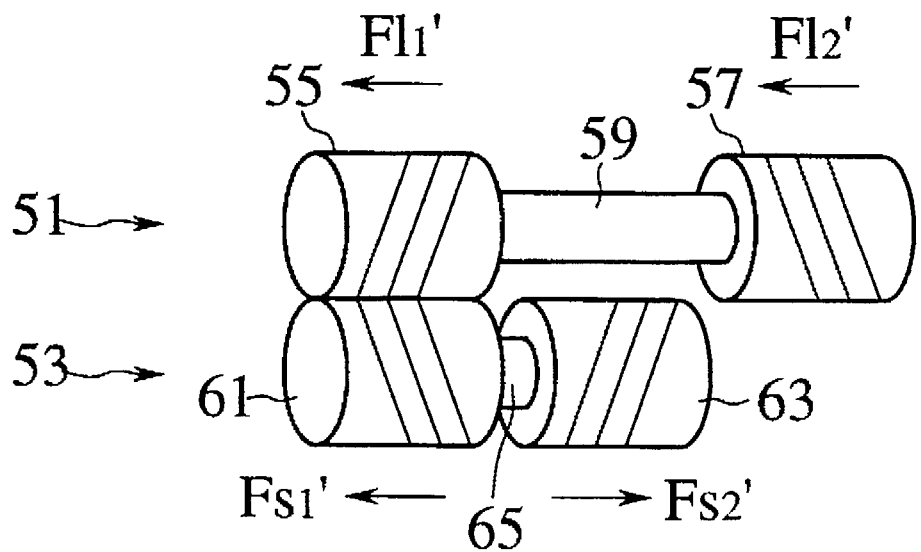
FIG. 4B is a diagrammatical perspective view showing the gear arrangement of the first and second gear portions of the long and short helical pinion gears in the first embodiment, in which the helix gear tooth angles of the first and second gear portions thereof are opposite to each other.
Figure 5:
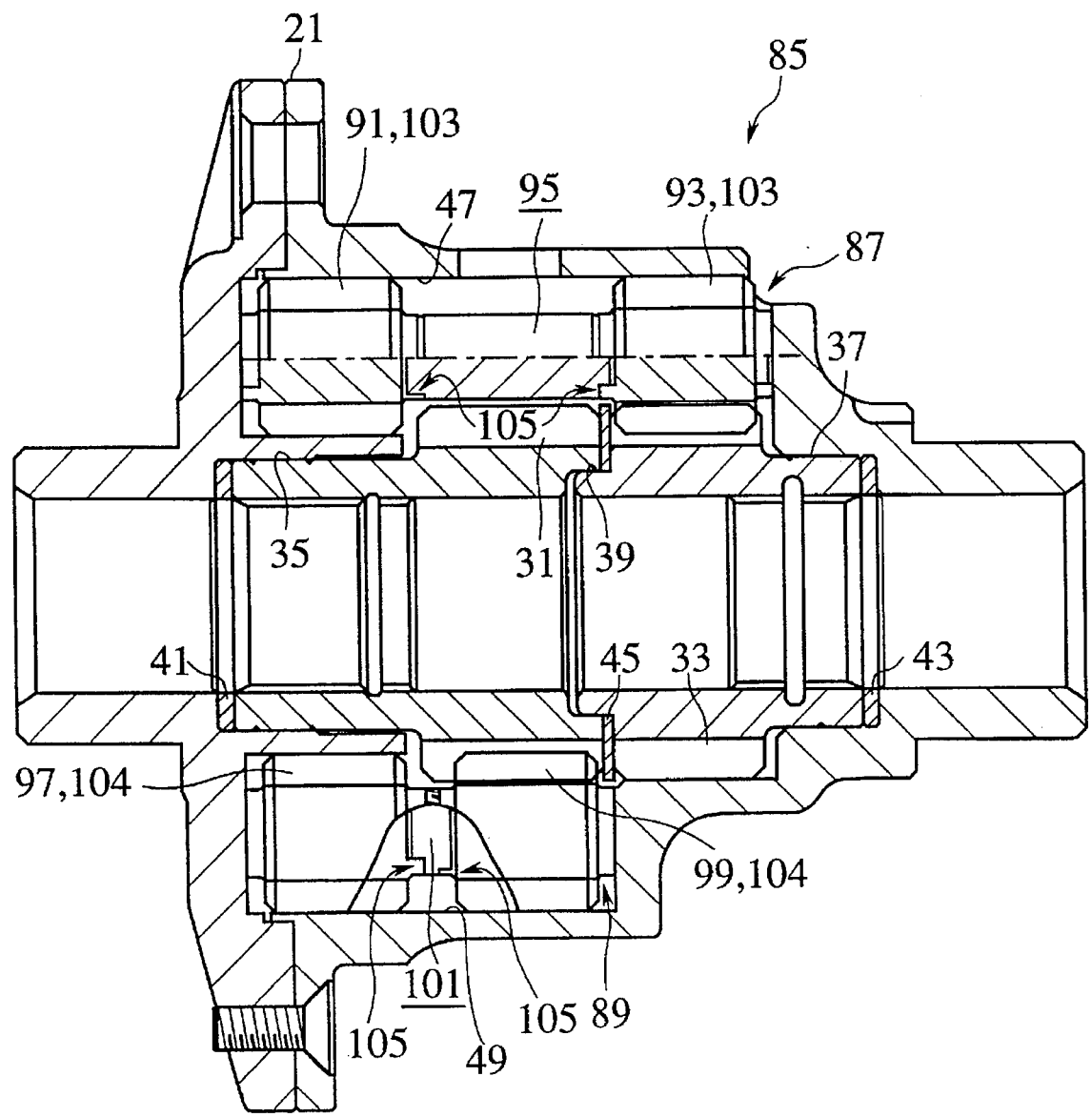
FIG. 5 is a cross-sectional view showing a second embodiment of the differential apparatus according to the present invention.

On the other hand, in FIG. 4B, the helix angles of the teeth of the first and second gear portions 55 and 57 or 61 and 63 are opposite to each other, respectively (B type). In this case, since the directions of the thrust forces of the two pinion gears 55 and 57 or 61 and 63 are the same with respect to each other, the resultant thrust force F' can be expressed as follows:

$$F'=Fl_1'+Fl_2'+Fs_1'+Fs_2'$$

where $Fl_1'$ denotes the thrust force generated by the first gear portion 55 of the long helical pinion gear 51; $Fl_2'$ denotes the thrust force generated by the second gear portion 57 of the long helical pinion gear 51; $Fs_1'$ denotes the thrust force generated by the first gear portion 61 of the short helical pinion gear 51; and $Fs_2'$ denotes the thrust force generated by the second gear portion 63 of the short helical pinion gear 51. Further, the actual differential limiting force can be obtained by multiplying the resultant thrust force F' by a friction coefficient fc.

Therefore, it is possible to change the differential limiting force from a minimum Ffc to a maximum F'fc by controlling the thrust forces determined by the helix angle relationship (types A and B) of the long and short helical pinion gears 51 and 53.

In the differential apparatus 7 of the present invention as described above, since the first gear portion 55 of the long helical pinion gear 51 and the first gear portion 61 of the short pinion gears 53 can be formed by the same element (blank) (although the helix gear tooth angle 67 of the long helical pinion gear 51 is opposite to that 68 of the short helical pinion gear 53), it is possible to simply change the helix angle relationship from the A type to B type or vice versa, by only exchanging the first gear porion 55 coupled to the gear shaft 59 with the first gear portion 61 or the first gear porion 61 coupled to the gear shaft 65 with the first gear portion 55, without preparing helical pinion gears of various helix angles as with the case of the conventional differential apparatus. As result, it is possible to realize the differential apparatus provided with various differential limiting characteristics applicable to various vehicle models, respectively at a low cost.

A second embodiment of the differential apparatus according to the present invention will be described hereinbelow with reference to FIGS. 5 to 7B, in which the same reference numerals have been retained for the similar parts or elements which have the same functions as with the case of the first embodiment. In the first embodiment, the first gear portion 55 and the second gear portion 57 of the long helical pinion gear 51 are fixedly coupled to the long gear shaft 59 thereof. In the same way, the first gear portion 61 and the second gear portion 63 of the short helical pinion gear 53 are also fixedly coupled to the short gear shaft 65 thereof. In this second embodiment, however, a first gear portion 91 and a second gear portion 93 of a long helical pinion gear 87 are coupled to a long gear shaft 95 thereof so as to be slidable in the axial direction thereof. In the same way, a first gear portion 97 and a second gear portion 99 of a short helical pinion gear 89 are also coupled to a short gear shaft 101 thereof so as to be slidable in the axial direction thereof.

In more detail, the differential apparatus 85 is roughly composed of the differential casing 21, a pair of the helical side gears 31 and 33, and two pairs of the helical pinion gears 87 and 89.

The differential casing 21 is formed with two pairs of long and short gear accommodating holes 47 and 49. Two pairs of long and short helical pinion gears 87 and 89 are accommodated in these holes 47 and 49 respectively, so as to be rotatable and further slidable therewithin.

The long pinion gear 87 is composed of a first gear portion 91 and a second gear portion 93, and a small-diameter gear shaft portion 95 for slidably connecting these two gear portions 91 and 93. The second gear portion 93 of the long pinion gear 87 is in mesh with the right helical side gear 33. On the other hand, the short pinion gear 89 is composed of a first gear portion 97 and a second gear portion 99, and a small-diameter gear shaft portion 101 for slidably connecting these two gear portions 97 and 99. The second gear portion 99 of the short pinion gear 89 is in mesh with the left helical side gear 31. Further, the first gear portion 91 of the long pinion gear 87 is in mesh with the first gear portion 97 of the short pinion gear 89.

Further, each of these four gear portions 91 and 93, 97 and 99 of the long and short helical gears 87 and 89 is formed with a cylindrical recessed portion 106 having a radial groove 107 (as described later in further detail) on both the end surfaces thereof, respectively. Therefore, the external shape (blank) of these gear portions is quite the same with respect to each other. However, the helix tooth angle 103 of the two gear portions 91 and 93 of the long helical pinion gear 87 is different from that 104 of the two gear portions 97 and 99 of the short helical gear 89.

Figure 6A:
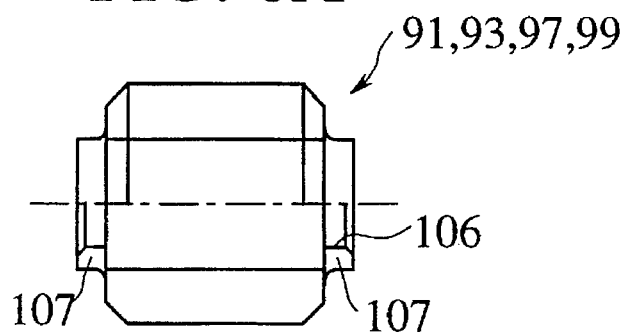
FIG. 6A is a side view showing the helical pinion gear used for the second embodiment shown in FIG. 5.
Figure 6B:
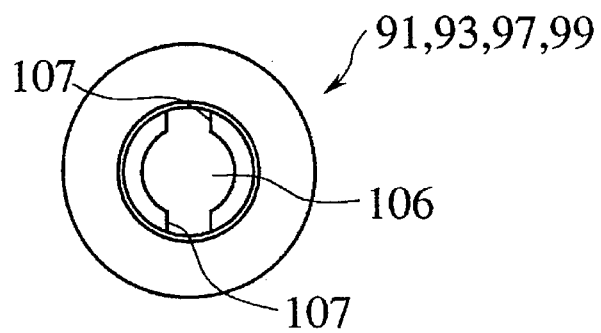
FIG. 6B is a front view showing the same helical pinion gear shown in FIG. 5.
Figure 7A:
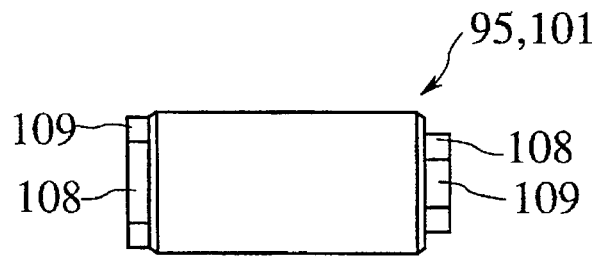
FIG. 7A is a side view showing the gear shaft of the helical pinion gear used for the second embodiment shown in FIG. 5.
Figure 7B:
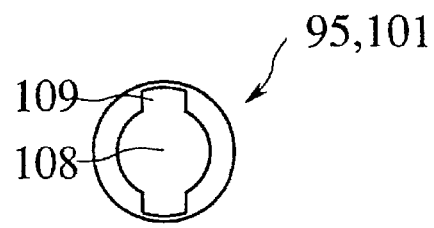
FIG. 7B is a front view showing the same gear shaft shown in FIG. 5.

In each of the long and short helical pinion gears 87 and 89, the respective gear portions 91 and 93 or 97 and 99 are coupled with the long and short gear shaft 95 or 101, respectively through a gear coupling portion 105. In more detail, as shown in FIGS. 6A and 6B, each gear portion 91, 93, 97 or 99 is formed with a central recessed portion 106 having a radial groove 107 on both end surfaces thereof. On the other hand, as shown in FIG. 7A and 7B, the gear shaft 95 (or 101) is formed with a central projection 108 having a radial projection 109 on both end surfaces thereof. Therefore, when the gear shaft 95 (or 101) is coupled with the gear portion 91, 93, 97 or 99 of the helical pinion gear 87 or 89 by inserting the central projection 108 and the radial projection 109 of the gear shaft Into the central recessed portion 106 and the radial groove 107 of the gear portion, it is possible to couple the gear portion with the gear shaft slidably only in the axial direction of the helical pinion gear.

The cylindrical projections 108 of the gear shaft 95 (or 101) having the radial projection 109 and the cylindrical recessed portions 106 having the radial groove 107 of the gear portions 91, 93, 97 and 99 constitute gear coupling means.

In this second embodiment, when the long and short helical pinion gears 87 and 89 are formed into the A type of the helix angle relationship, since the gear portions 91 and 93 or 97 and 99 of the long and short helical gear 87 or 89 are slidable in the axial direction thereof, a slight thrust force can be generated without being perfectly canceled with each other, so that it is possible to obtain a differential limiting force different from the A type of first embodiment (the first and second gears are fixed to each other); that is, a relatively small intermediate differential limiting force which is slightly larger than the minimum limiting force as with the case shown in FIG. 4A (the thrust forces are canceled).

Further, when the long and short helical pinion gears 87 and 89 are formed into the B type of the helix angle relationship, since the gear portions 91 and 93 or 97 and 99 of the long and short helical gear 87 or 89 are slidable in the axial direction thereof, the two thrust forces are not perfectly added to each other, so that it is possible to obtain a differential limiting force different from the B type of the first embodiment (the first and second gears are fixed to each other); that is, a relatively large intermediate differential limiting force which is slightly smaller than the maximum limiting force as with the case shown in FIG. 4B (the thrust forces are added).

A third embodiment of the differential apparatus according to the present invention will be described hereinbelow with reference to FIGS. 8A to 8B. In this third embodiment, the long helical pinion gear 111 is formed integral with each other; that is, the first and second gear portions 115 and 117 of the long helical pinion gear 111 are fixedly formed, and only the short helical pinion gear 89 is axially slidably formed.

Figure 8A:
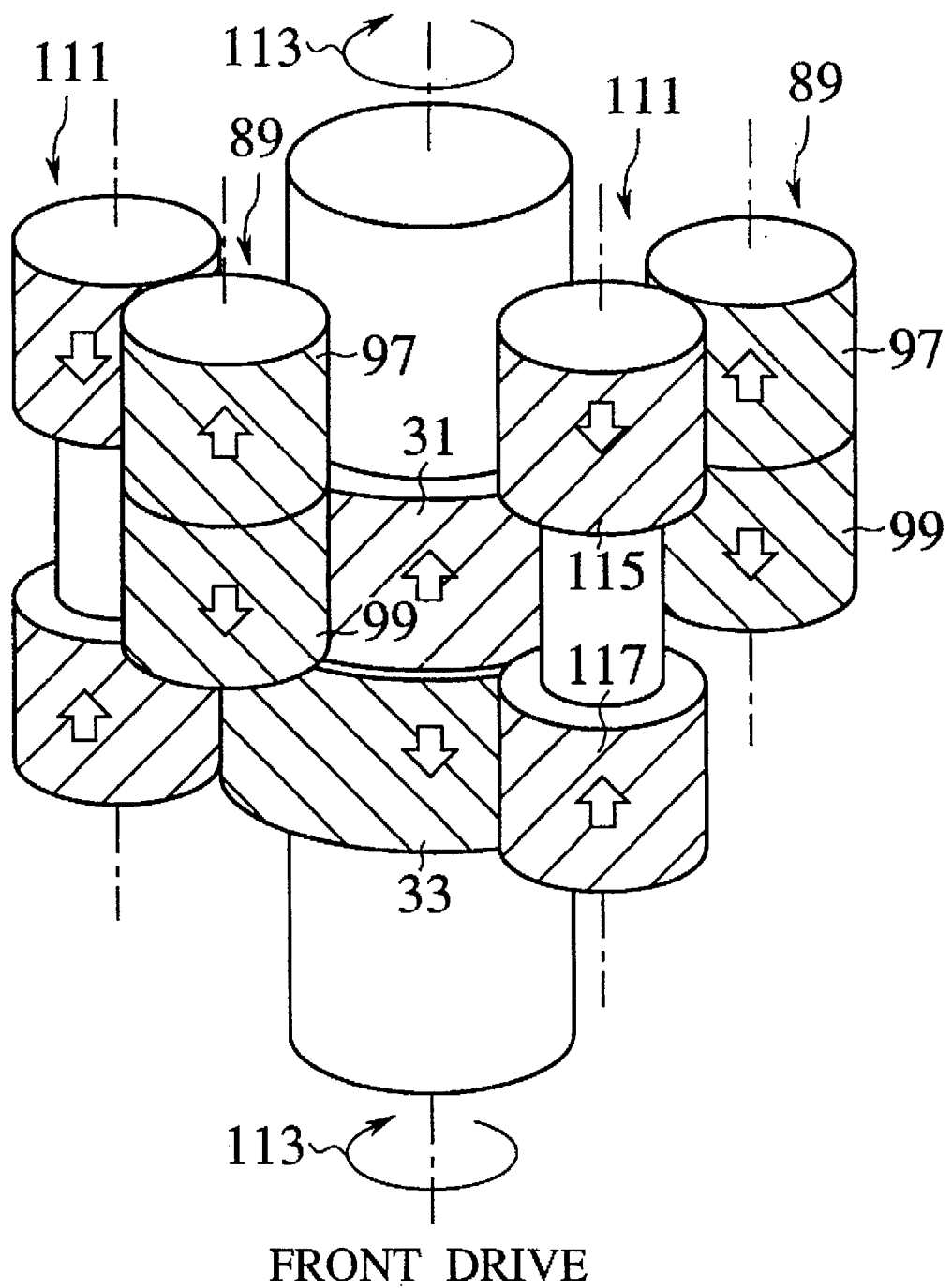
FIG. 8A is a diagrammatical perspective view for assistance in explaining the thrust directions generated in the respective helical pinion gears of a third embodiment of the differential apparatus, in which an automotive vehicle is driven in a frontward direction.
Figure 8B:
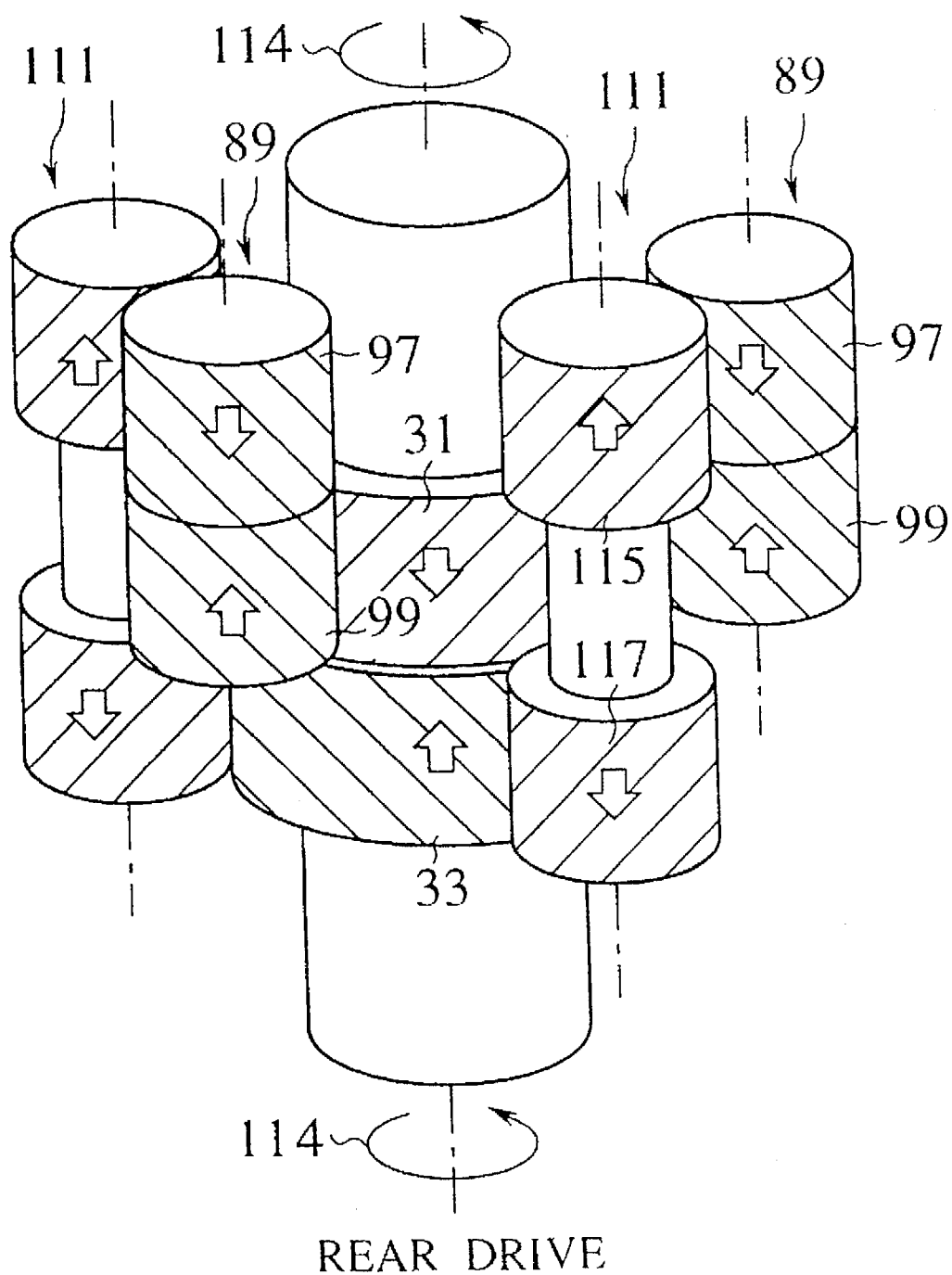
FIG. 8B is a diagrammatical perspective view for assistance in explaining the thrust directions generated in the respective helical pinion gears of the third embodiment of the differential apparatus, in which an automotive vehicle is driven in a rearward direction.

FIG. 8A shows the state where the vehicle is driven in the frontward direction and the reference numeral 113 denotes the rotational direction of the differential casing 21 and FIG. 8B shows the state where driven in the rearward direction and 114 denotes the rotational direction of the same.

In the long and short helical pinion gears 111 and 89, the helix angle of the gear teeth of the first gear portion 97 is the same as that of the second gear portion 99; and the helix angle of the gear teeth of the first gear portion 115 is the same as that of the second gear portion 117, so that the helix angle relationship is of A type. In this A type, although the thrust forces of the first and second gear portions 115 and 117 or 97 and 99 are generated in opposite directions, respectively, a differential limiting force can be generated by the short helical pinion gear 89 only when the vehicle is driven in the frontward direction as shown in FIG. 8A. This is because when the vehicle is driven in the rearward direction as shown in FIG. 8B, the two thrust forces of the first and second gear portions 97 and 99 are canceled with each other. As a result, since the differential limiting force can be increased only during the frontward drive, as compared with that during the rearward drive, it is possible to prevent the interference with the antilock brake system (ABS).

In the third embodiment of the present invention, since the two gear portions 115 and 117 of the long helical pinion gear 111 are fixed but two gear portions 97 and 99 of the short helical pinion gear 89 are coupled to each other so as to be movable in the axial direction, it is not only to select any one of the two helix angle relationship types A and B, but also to select an intermediate differential limiting force between the two types.

Further, in the differential apparatus according to the present invention, it is also possible to form only one or both of the long and short helical pinion gears or some or all of the helical pinion pairs as the A or B type, to more finely adjust the differential limiting force.

Figure 9:
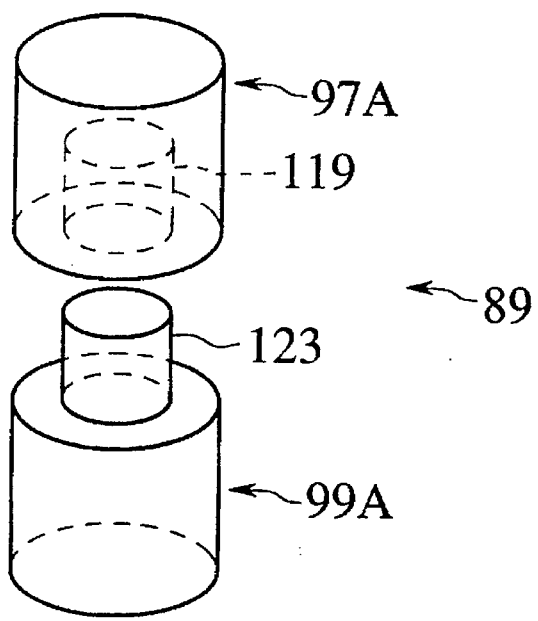
FIG. 9 is a perspective view showing an example of the coupling portion of the short helical pinion gear.
Figure 10:
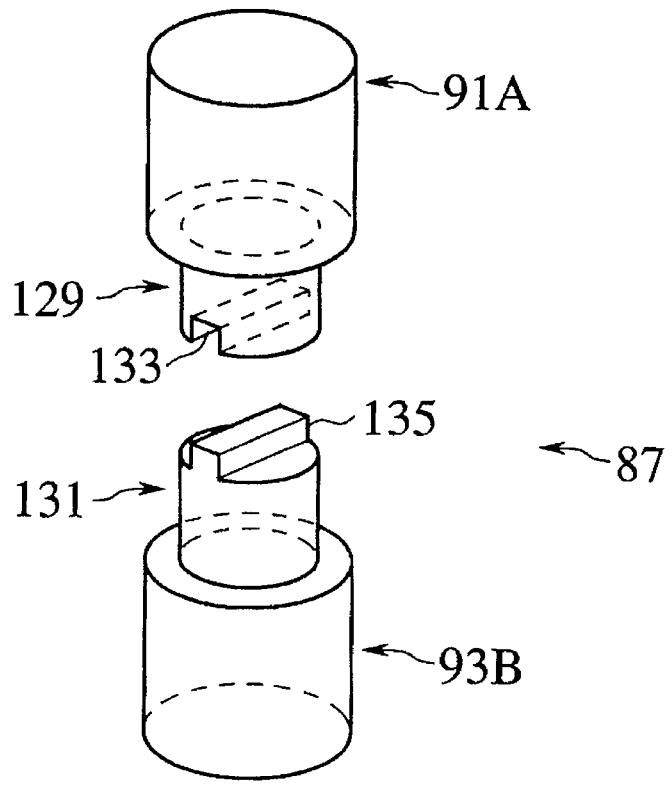
FIG. 10 is a perspective view showing the other example of the coupling portion of the long helical pinion gear.

Further, the gear coupling means of the differential apparatus according to the present invention are not limited to only the above-mentioned structures, and various modifications can be made as follows:

FIGS. 9 and 10 show the other examples of the helical gear coupling portion, respectively. In the case shown in FIG. 9, a first gear portion 97A of the short helical pinion gear 89 is formed with a cylindrical recess 119, and a second gear portion 99A of the same short helical pinion gear 89 is formed with a cylindrical projection 123 fitted to the cylindrical recess 119. Further, the first and second gear portions 97A and 99A are coupled with the use of an appropriate spline or key for prevention of rotation.

In the case shown in FIG. 10, a first gear portion 91A of the long helical gear 87 is formed with a gear shaft portion 129 formed with a radial recess 133, and a second gear portion 93B of the same long helical gear 87 is formed with a gear shaft portion 131 formed with a radial projection 135. Further, the first and second gear portions 91A and 93B are coupled by engaging the radial projection 135 with the radial recess 133.

As described above, in the differential apparatus according to the present invention, since the first and second gear portions of the long and short helical pinion gears can be coupled by use of the common gear coupling portion, it is possible to easily change the helix angle relationship between the two helical pinion gears by exchanging the first gear portion with the second gear portion or vice versa, so that it is possible to generate a small differential limiting force (A type) or a large differential limiting force (B type).

Further, when the gear portions of the helical pinion gears are formed axially movably, it is possible to further finely adjust the differential limiting force of the differential apparatus. As a result, it is possible to selectively obtain any desired differential limiting force in a wide range according to various vehicle models at relatively low cost, without previously providing a number of different helical pinion gears.

In addition, when the first and second gear portions of one of the long and short helical pinion gears are formed so as to be movable axially, since the differential limiting force can be increased only during the frontward drive, it is possible to prevent the interference of the engine brake with the antilock brake system.

Further, in assembling process of the helical pinion gears, since the respective helical pinion gears can be engaged with the related other helical gear or gears one by one, it is possible to facilitate the assembly work of the differential apparatus of helical gear type.

What is claimed is:

1. A differential apparatus, comprising:
   a differential casing;
   a pair of helical side gears arranged at a central portion of said differential casing;
   at least one pair of long and short helical pinion gears arranged around said helical side gears within said differential casing, said long helical pinion gear being composed of first and second gear portions and said short helical pinion gear being composed of first and second gear portions, the first gear portion of said long helical pinion gear being in mesh with the first gear portion of said short helical pinion gear, the second gear portion of said long helical pinion gear being in mesh with said second helical side gear and the second gear portion of said short helical pinion gear being in mesh with said first helical side gear; and
   gear coupling means for detachably coupling the separate first and second gear portions of at least one of said long and short helical pinion gears so that one of the first or second gear portions may be replaced with another gear portion in order to vary the thrust force of the pinion gear.

2. The differential apparatus of claim 1, wherein said gear coupling means includes common gear coupling means for coupling the first and second gear portions of said long helical pinion gear via a long gear shaft and the first and second gear portions of said short helical pinion gear via a short gear shaft.

3. The differential apparatus of claim 2, wherein said common gear coupling means fixedly couples the first and second gear portions of said long and short helical pinion gears.

4. The differential apparatus of claim 2, wherein said common gear coupling means couples the first and second gear portions of said long and short helical pinion gears, axially movably.

5. The differential apparatus of claim 3, wherein said common gear coupling means comprises:
   cylindrical recessed portions formed on at least one side of each of the first and second gear portions of said long and short helical pinion gears, respectively, each of said cylindrical recessed portions being engaged with one of cylindrical projections formed on both sides of the long and short gear shafts, respectively; and
   gear fixing pins each for fixedly coupling each of the first and second gear portions of said long and short helical pinion gears with the long and short gear shafts, respectively.

6. The differential apparatus of claim 4, wherein said common gear coupling means comprises cylindrical recessed portions having a radial groove formed on both sides of each of the first and second gear portions of said long and short helical pinion gears, respectively, said cylindrical recessed portions being engaged with one of cylindrical projections having a radial projection formed on both sides of the long and short gear shafts, respectively.

7. The differential apparatus of claim 4, wherein said gear coupling means comprises:
   a cylindrical recessed portion formed on one side of one of the first and second gear portions of said short helical pinion gear; and
   a cylindrical projection formed on one side of the other of the first and second gear portions of said short gear shaft, the cylindrical projection being engaged with the cylindrical recessed portion.

8. The differential apparatus of claim 3, wherein said gear coupling means comprises:
   a cylindrical projection portion having a radial recessed portion formed on one side of one of the first and second gear portions of said long helical pinion gear; and
   a cylindrical projection having a radial projection formed on one side of one of the first and second gear portions of said long helical pinion gear, the radial projection being engaged with the radial recessed portion.

9. The differential apparatus of claim 3, wherein said gear coupling means is a gear shaft formed integral with the first and second gear portions of said long helical pinion gear.

10. The differential apparatus of claim 3, wherein the first and second gear portions of said long and short helical pinion gears are fixedly coupled via the long and short gear shafts, respectively, by said gear coupling means, such that helix gear tooth angles of the first and second gear portions of each of said long and short helical pinion gears are the same with respect to each other, respectively, and thrust forces generated by gearing among said long and short helical pinion gears and said side gears are canceled by each other to generate a minimum differential limiting force.

11. The differential apparatus of claim 3, wherein the first and second gear portions of said long and short helical pinion gears are fixedly coupled via the long and short gear shafts, respectively, by said gear coupling means, such that helix gear tooth angles of the first and second gear portions of each of said long and short helical pinion gears are opposite to each other, respectively, and thrust forces generated by gearing among said long and short helical pinion gears and said side gears are added to each other to generate a maximum differential limiting force.

12. The differential apparatus of claim 4, wherein the first and second gear portions of said long and short helical pinion gears are coupled to be axially movable via the long and short gear shafts, respectively, by said gear coupling means, such that helix gear tooth angles of the first and second gear portions of each of said long and short helical pinion gears are the same with respect to each other, respectively, and thrust forces generated by gearing among said long and short helical pinion gears and said side gears are partially canceled by each other to generate an intermediate differential limiting force.

13. The differential apparatus of claim 2, wherein the first and second gear portions of said long helical pinion gears are fixedly coupled via the long gear shaft by said gear coupling means, and the first and second gear portions of said short helical pinion gear are coupled to be axially movable via the short gear shaft by said gear coupling means, such that helix gear tooth angles of the first and second gear portions of each of said long and short helical pinion gears are the same with respect to each other, respectively, and thrust forces generated by gearing among said long and short helical pinion gears and said side gears are partially canceled by each other to generate an intermediate differential limiting force only when said helical pinion gears are rotated in predetermined directions.

14. A differential apparatus, comprising:

a differential casing;

a pair of helical side gears arranged at a central portion of said differential casing;

at least one pair of long and short helical pinion gears arranged around said helical side gears within said differential casing, said long helical pinion gear being composed of first and second gear portions and said short helical pinion gear being composed of first and second gear portions, the first gear portion of said long helical pinion gear being in mesh with the first gear portion of said short helical pinion gear, the second gear portion of said long helical pinion gear being in mesh with said second helical side gear and the second gear portion of said short helical pinion gear being in mesh with said first helical side gear; and gear coupling means for coupling the separate first and second gear portions of at least one of said long and short helical pinion gears, said gear coupling means including common gear coupling means for coupling the first and second gear portions of said long helical pinion gear via a long gear shaft and the first and second gear portions of said short helical pinion gear via a short gear shaft, said common gear coupling means fixedly coupling the first and second gear portions of said long and short helical pinion gears, and said common gear coupling means comprising:

cylindrical recessed portions formed on at least one side of each of the first and second gear portions of said long and short helical pinion gears, respectively, each of said cylindrical recessed portions being engaged with one of cylindrical portions formed on both sides of the long and short gear shafts, respectively; and gear fixing pins each for fixedly coupling each of the first and second gear portions of said long and short helical pinion gears with the long and short gear shafts, respectively.

15. A differential apparatus, comprising:

a differential casing;

a pair of helical side gears arranged at a central portion of said differential casing;

at least one pair of long and short helical pinion gears arranged around said helical side gears within said differential casing, said long helical pinion gear being composed of first and second gear portions and said short helical pinion gear being composed of first and second gear portions, the first gear portion of said long helical pinion gear being in mesh with the first gear portion of said short helical pinion gear, the second gear portion of said long helical pinion gear being in mesh with said second helical side gear and the second gear portion of said short helical pinion gear being in mesh with said first helical side gear; and gear coupling means for coupling the separate first and second gear portions of at least one of said long and short helical pinion gears, said gear coupling means including common gear coupling means for coupling the first and second gear portions of said long helical pinion gear via a long gear shaft and the first and second gear portions of said short helical pinion gear via a short gear shaft, said common gear coupling means fixedly coupling the first and second gear portions of said long and short helical pinion gears, and said gear coupling means comprising:

a cylindrical projection portion having a radial recessed portion formed on one side of one of the first and second gear portions of said long helical pinion gear; and a cylindrical projection having a radial projection formed on one side of one of the first and second gear portions of said long helical pinion gear, the radial projection being engaged with the radial recessed portion.

16. A differential apparatus, comprising:

a differential casing;

a pair of helical side gears arranged at a central portion of said differential casing;

at least one pair of long and short helical pinion gears arranged around said helical side gears within said differential casing, said long helical pinion gear being composed of first and second gear portions and said short helical pinion gear being composed of first and second gear portions, the first gear portion of said long helical pinion gear being in mesh with the first gear portion of said short helical pinion gear, the second gear portion of said long helical pinion gear being in mesh with said second helical side gear and the second gear portion of said short helical pinion gear being in mesh with said first helical side gear; and gear coupling means for coupling the separate first and second gear portions of at least one of said long and short helical pinion gears, said gear coupling means including common gear coupling means for coupling the first and second gear portions of said long helical pinion gear via a long gear shaft and the first and second gear portions of said short helical pinion gear via a short gear shaft, said common gear coupling means coupling the first and second gear portions of said long and short helical pinion gears, axially movably, and said common gear coupling means comprising cylindrical recessed portions having a radial groove formed on both sides of each of the first and second gear portions of said long and short helical pinion gears, respectively, said cylindrical recessed portions being engaged with one of cylindrical projections having a radial projection formed on both sides of the long and short gear shafts, respectively.

17. A differential apparatus, comprising:

a differential casing;

a pair of helical side gears arranged at a central portion of said differential casing;

at least one pair of long and short helical pinion gears arranged around said helical side gears within said differential casing, said long helical pinion gear being composed of first and second gear portions and said short helical pinion gear being composed of first and second gear portions, the first gear portion of said long helical pinion gear being in mesh with the first gear portion of said short helical pinion gear, the second gear portion of said long helical pinion gear being in mesh with said second helical side gear and the second gear portion of said short helical pinion gear being in mesh with said first helical side gear; and gear coupling means for coupling the separate first and second gear portions of at least one of said long and short helical pinion gears, said gear coupling means including common gear coupling means for coupling the first and second gear portions of said long helical pinion gear via a long gear shaft and the first and second gear portions of said short helical pinion gear via a short gear shaft, said common gear coupling means coupling the first and second gear portions of said long and short helical pinion gears, axially movably, and said gear coupling means comprising:

a cylindrical recessed portion formed on one side of one of the first and second gear portions of said short helical pinion gear; and a cylindrical projection formed on one side of the other of the first and second gear portions of said short gear shaft, the cylindrical projection being engaged with the cylindrical recessed portion.

* * * * *